(12) United States Patent
Balandin et al.

(10) Patent No.: US 7,991,880 B2
(45) Date of Patent: Aug. 2, 2011

(54) BIONETS ARCHITECTURE FOR BUILDING SERVICES CAPABLE OF SELF-EVOLUTION

(75) Inventors: Sergey Balandin, Helsinki (FI); Elena Balandina, Helsinki (FI)

(73) Assignee: Nokia Corporation, Espoo (FI)

( * ) Notice: Subject to any disclaimer, the term of this patent is extended or adjusted under 35 U.S.C. 154(b) by 416 days.

(21) Appl. No.: 12/060,046

(22) Filed: Mar. 31, 2008

(65) Prior Publication Data
US 2009/0245140 A1 Oct. 1, 2009

(51) Int. Cl.
*G06F 15/173* (2006.01)
(52) U.S. Cl. ......................... 709/224; 709/223
(58) Field of Classification Search ........... 709/223–224
See application file for complete search history.

(56) References Cited

U.S. PATENT DOCUMENTS

| | | | | |
|---|---|---|---|---|
| 5,375,070 A | * | 12/1994 | Hershey et al. | 709/224 |
| 6,611,867 B1 | * | 8/2003 | Bowman-Amuah | 709/224 |
| 7,783,745 B1 | * | 8/2010 | Bhargava et al. | 709/224 |
| 2008/0301295 A1 | * | 12/2008 | Malkin et al. | 709/224 |

FOREIGN PATENT DOCUMENTS

| | | |
|---|---|---|
| EP | 1752874 A1 | 2/2007 |
| WO | 9934622 A1 | 7/1999 |

OTHER PUBLICATIONS

Carreras, et al., "BIONETS: Bio-Inspired Networking for Pervasive Communication Environments". In IEEE Transactions on Vehicular Technology, New Jersey, IEEE, 2007, vol. 56, p. 218-229.
International Search Report and Written Opinion for International Application No. PCT/FI2009/050185, mailed Jun. 17, 2009, 14 pages.

* cited by examiner

*Primary Examiner* — Bharat N Barot
(74) *Attorney, Agent, or Firm* — Banner & Witcoff, Ltd.

(57) ABSTRACT

Systems and methods are provided for effectuating a basis for implementing services capable of self-creation, self-evolution and/or substantive personalization without direct intervention from, e.g., a service provider. The resulting services are flexible and user-friendly, as a basic set of service primitives can be updated and extended at any point. Additionally, new and/or improved service functionality that is adapted to a user's behavior is done so in a non-intrusive manner. Additionally, implementation of service families, meta-service and readdressing as described above in accordance with various embodiments allows for the maximization of, e.g., a community training effect, when some interesting service finding of one community user can be easily shared and utilized by other users. Moreover, the systems and methods described herein for implementing/providing a basis for a flexible architecture minimizes resource consumption on the client side.

33 Claims, 7 Drawing Sheets

BIONETS ARCHITECTURE FOR BUILDING SERVICES CAPABLE OF SELF-EVOLUTION

FIELD OF THE INVENTION

The present invention relates generally to the field of service creation and service provision in global and local (or personalized) networks. More specifically, the present invention relates to flexible architectures for service creation, provision, and self-evolution of biologically inspired network and services (BIONETS).

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

BIONETS refers to the framework of a European Union (EU) project that seeks to promulgate networks and services that are modeled after, e.g., bio-inspired, self-evolving, ecological, and/or socio-economic communities. It is desired that such types of networks and services further the trend towards pervasive communication environments, where distributed networks can replace "fully-connected" networks. For example, autonomic networks or systems can comprise mobile devices, referred to as user nodes (U-Nodes) and embedded sensing devices referred to as tiny nodes (T-Nodes), where the T-Nodes are capable of sensing environmental/contextual data that can be utilized by the U-Nodes to, e.g., enhance services.

One desired characteristic identified in BIONETS involves evolution, where autonomic networks, systems, services, protocols, etc. continuously undergo self-optimization to provide increasingly "better" service to the U-Nodes. It is foreseen that services may also die out from, e.g., obsolescence and failure to satisfy the needs of users. Evolution in BIONETS can comprise a variety of different and/or inter-related processes, such as transformation operations, fitness evaluations, competitive selection, and communication, where communication can be utilized to, e.g., exchange information for the transformation operations, fitness evaluation feedback, etc.

Additionally, evolution can be considered in terms of at least two perspectives, for example, micro/microscopic-evolution and macro/macroscopic-evolution. Micro-evolution refers to the evolution of smaller operations, such as individual programs or service blocks that may implement a particular service, and transformation operations related to such individual programs, for example, self-tuning parameters. Macro-evolution refers to the global impact or evolution that the smaller operations or service blocks have on a larger network or system, such as the interaction between the individual programs and how certain individual programs may replicate and/or propagate throughout a network, cooperation between individual programs, etc.

One issue in service development is that, while oftentimes it is possible to recognize a user's dissatisfaction with a service, it is difficult to formally crystallize the user's problem in a manner that would allow for the resolution of the problem. Moreover, a user may, for example, misinterpret the existing dissatisfaction. Hence, a developer seeking to address the user's dissatisfaction attempts to create a remedy by following a "false path" based upon the user's misinterpretation. As a result, the user's dissatisfaction can go unresolved or unaddressed.

Services deployed and used in conventional networks are strongly focused or oriented to completing a certain task, but do not provide enough flexibility for self-evolution, customization, and/or personalization to the specific needs of different users. Furthermore, even when generalized service development is properly focused to completing a task, a lack of self-evolution capability remains a limiting factor to the completion of that task. For example, scenarios can exist where a service can provide 95% of a user's needs and requirements, but the remaining 5% defines overall success of the service. In addition, service adjustment conventionally involves a plethora of human resources, which may result in inefficient service adjustment. Even when a problem is properly identified, oftentimes, too much time is spent in modifying the service to address the problem and in deploying a new version of the service throughout a network. This is turn can often result in the loss of one or more business opportunities.

SUMMARY OF THE INVENTION

Various embodiments provide a basis for implementing information technology (IT) and telecommunications services capable of self-creation, self-evolution and/or substantive personalization without direct intervention from a service provider. The resulting services are flexible and user-friendly, as a basic set of service primitives can be updated and extended at any point. Additionally, the updating and extension need not have an immediate impact to a service, thereby providing a new and/or improved functionality that is adapted to a user's behavior in smooth and "friendly" manner. Implementation of service families, meta-service and readdressing in accordance with various embodiments allows for the maximization of a community training effect, when some interesting service is found by of one community user can be easily shared and utilized by other users. Moreover, the systems and methods described herein for implementing/providing a basis for a flexible architecture minimizes resource consumption on the client side.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of the invention are described by referring to the attached drawings, in which.

DETAILED DESCRIPTION OF VARIOUS EMBODIMENTS

Various embodiments described herein provide systems and methods of effectuating service creation/evolution and provisioning in global networks such as autonomic networks contemplated in the BIONETS environment. Furthermore, services created can be integrated with various data sources including, for example, basic Internet services and sensor (T-Nodes, and others.) data.

Additionally, various embodiments address the development of one or more flexible architectures that can support service creation/development and provisioning in addition to self-evolution. Therefore, various embodiments allow for continued self learning, customization and adjustment of BIONETS services to the needs and expectations of users in accordance with characteristics such as those exhibited by biological organisms, for example, the ability to continuously adopt itself to an ever-changing environment.

From a user-experience point-of-view, a BIONETS service architecture can be thought of as a mechanism for analyzing a chain of tasks executed by the user before a particular service is started, in parallel with execution of the particular service, and immediately after its execution. In other words, an analysis of obtained results can create a basis for automated service evolution and personalization, while at the same time utilizing certain characteristics of the BIONETS service architecture itself.

Figure 1:
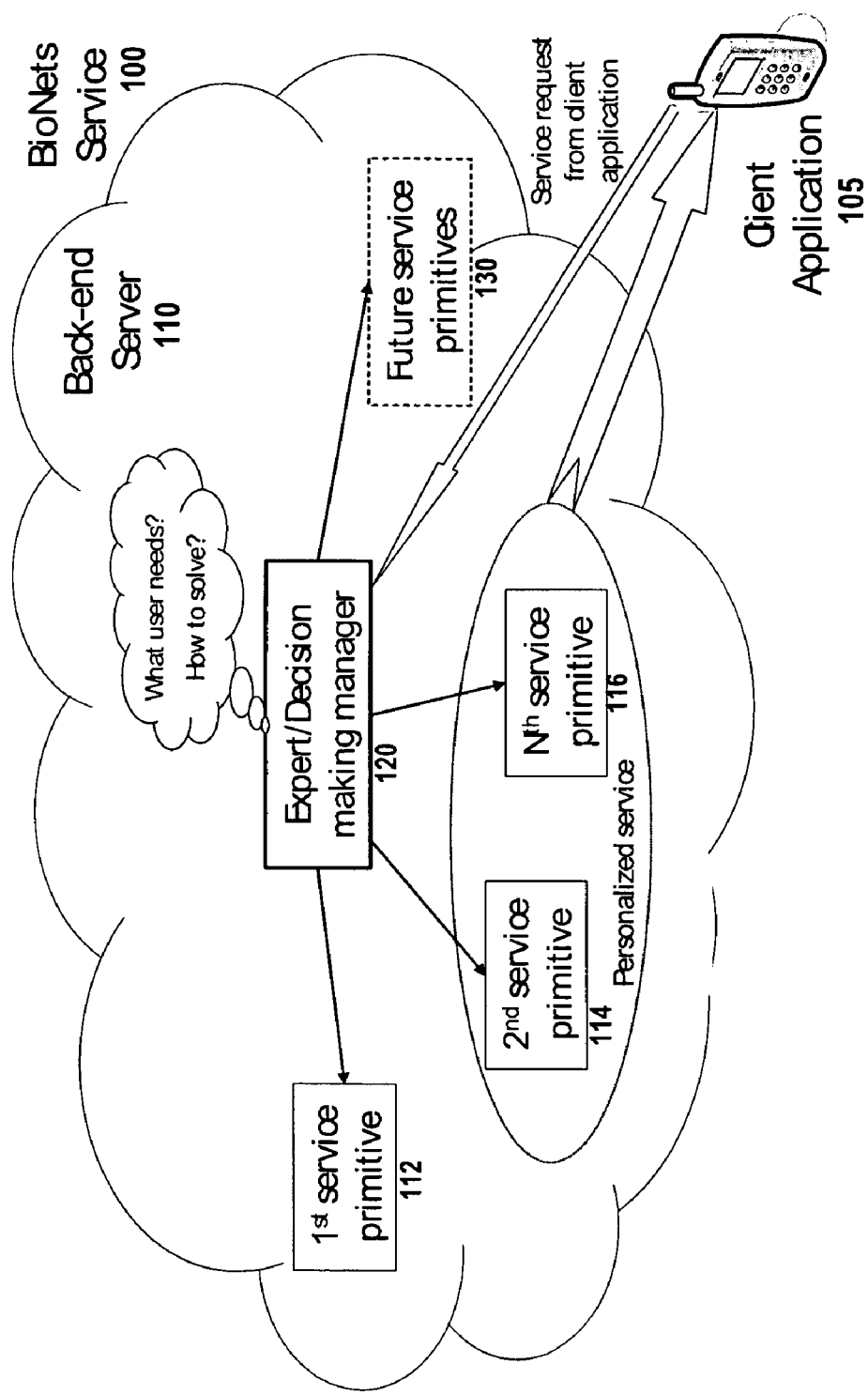
FIG. 1 illustrates an exemplary structure of a BIONETS service provisioning architecture in accordance with various embodiments.

FIG. 1 illustrates a BIONETS service 100 that can have a distributed architecture comprised of at least two types of modules such as a client and a server. FIG. 1 illustrates that the client can be an application or module 105 installed on a user's mobile device. The server can be a back-end server 110 comprising, for example, a plurality of service primitives combined into a solid service by another module referred to as an "Expert/Decision making manager" 120. Additionally, the service primitives 112, 114, and 116 making up the back-end server 110 may be distributed in a back-end network encompassing the back-end server 110. The back-end server 110 may be distributed over more than one network in the conventional sense of a network.

The client application 105 may be configured to remain active at all time so that it is available whenever a user desires access to BIONETS services. Hence, the role of the client application 105 may comprise, but is not limited to, providing a user interface (UI) for each individual BIONETS application, maintaining service personal preferences, and continuously monitoring a user's activities when the client module is active.

It should be noted that the monitoring of user activities may be targeted when constructing patterns of most-commonly-used-sequences of BIONETS services. Moreover, the parallel use of $3^{rd}$ party applications may also be monitored by the client application 105. For example, monitoring by the client module 105 may include a number of measurements indicating how long each operation in a particular instance of user interaction with the BIONETS service 100 takes. That is, some phases or operations effectuated during a user's interaction with the BIONETS service 100 may, for example, be undesirably long. Hence, certain solutions should be found to decrease the user's waiting time. Alternatively, some additional user entertainment service primitive can be introduced to keep the user from becoming dissatisfied with the waiting time. As described above, the monitoring by the client application 105 can further comprise determining during which phases or operations of the BIONETS service 100 that the user switches to a parallel task, as well as determining the type of parallel task that was switched to. These monitoring scenarios are merely exemplary and other types of monitoring and the monitoring of various processes and/or operations can be effectuated in accordance with various embodiments.

The collected measurements may be processed on the client side at the client application 105 and once a pattern of behavior is identified, the corresponding BIONETS service 100 can be modified to match and/or address the observed behavior or personal preferences. Additionally, a behavior sequence can be defined as a candidate for a particular pattern of behavior after, for example, a second execution of the BIONETS service 100. Depending on the settings associated with the BIONETS service 100, the candidate pattern may then graduate to becoming an active pattern. A candidate pattern can become an active pattern when certain formal conditions are fulfilled or after a corresponding service change is presented to the user and approved. The resulting active pattern thus defines a script for executing a sequence of services as well as any new service primitives inherited from a $3^{rd}$ party application when possible. Alternatively still, the client application 105 may request an alternative implementation of the BIONETS server 100 which is then forwarded to the Expert/Decision making manager 120.

As a result of the above operations, future service primitives 130 can result that either effectuate an evolution of the back-end server 110 and/or the BIONETS service 100 itself. Furthermore, after each BIONETS session, such as the execution of a BIONETS service 100, the client application 105 may send, measurements and information about new active patterns to the Expert/Decision making manager 120 at the back-end server 110 for later use in the service families' building process for the future service primitives 130. The measurements and information generated during the BIONETS session is sent post-processed to ensure a user's privacy.

Figure 2:
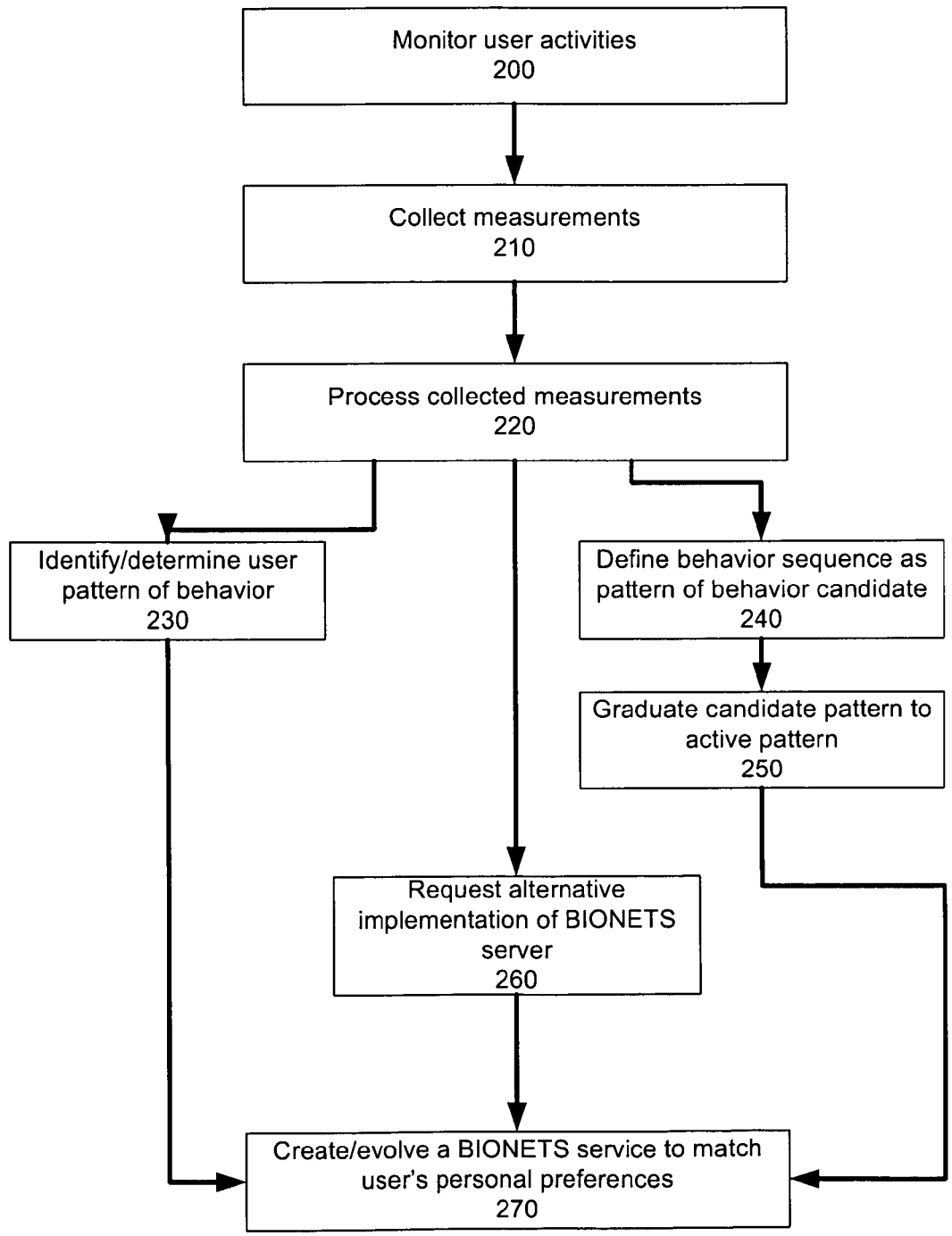
FIG. 2 illustrates a flow chart describing operations performed in accordance with various embodiments for the creation/evolution of BIONETS services.

FIG. 2 is a flow chart illustrating various operations performed to effectuate self-creation/evolution and provisioning of BIONETS services. At 200, a client application 105 can monitor a user's activities. As described above, the monitoring of activities may include measuring the user's time of interaction with a service. At 210, the measurements associated with the various monitoring operations may be collected. Processing of the collected measurements is then performed at 220 at the client side. A user pattern of behavior can then be identified and determined from the collected measurements at 230, at which time, a BIONETS service can be created and/or evolved to match the user's personal preferences at 270. Alternatively, a behavior sequence can be defined as a pattern of behavior candidate at 240, which at 250, can graduate to becoming an active pattern that is used when certain conditions have been fulfilled or when a user approves a corresponding service change that has evolved based on the pattern of behavior. Such processes result in the creation/evolution of a BIONETS service at 270. Further still, a user may simply request an alternative implementation of a BIONETS server at 260, which may result in the evolution of the BIONETS server itself and/or a related BIONETS service(s) at 270. It should be noted that more or fewer operations can be performed in accordance with various embodiments.

An exemplary scenario that can take advantage of the systems and methods of various embodiments described herein may include, for example, a public stock market monitoring service that provides a current value of a given stock. In this case, a user may utilize a "stock ticker" service that provides the user with periodic or constant updates which inform the user of a particular stock's value at a given time. In accordance with various embodiments, instead of simply continuing to provide stock values as is done with conventional services of this type, the stock ticker service may evolve by monitoring the user's interaction with the stock ticker service. For example, it may be noticed that the user oftentimes will execute a calculator application in parallel with the stock ticker service and utilize that calculator to multiply stock values by a certain number (e.g., the number of stocks held by the user).

After observing this behavior of executing the calculator application in parallel with the stock ticker service a predetermined number of times, the stock ticker service can undergo self-evolution by deciding to improve the services it provides by embedding calculator functionality and a corresponding UI in its stock ticker service. Moreover, the stock ticker service may by default, automatically multiply a given stock's value by the earlier observed value representing the number of stocks held by the user, thus preempting the need for the user to manually perform the multiplication operation herself. It should be noted, however, that the user may always refuse any of the proposed service modifications/evolutions in certain embodiments using, for example, a configuration menu. Therefore, the user still maintains reasonable control over any service she utilizes while being able to take advantage of the self-creation, self-evolution, and self-provisioning of those services.

Referring again to FIG. 1, the back-end server module 110 may comprise a set of service primitives 112, 114, and 116 that may be extended and modified at any time. Additionally, provisions may be made in accordance with various embodiments so that such extensions and/or modifications will not take place if they would lead to a quick or immediate change of the user experience. In other words, various embodiments may be configured in different ways to evolve at a rate that is acceptable to users' expectations and desires. With regard to the stock ticker service described above as an example, it may not be appropriate to extend the service to include a calculator and present a multiplication if the relevant user only accessed the calculator and performed the multiplication one time. Doing so may lead to dissatisfaction with the stock ticker service because the user may not want to make such calculations each time the stock ticker service presents a new stock value.

Therefore, when a service provider desires to replace an "old" functional block with a new functional block, it is done by adding a service primitive(s) corresponding to the new functionality into the existing set of service primitives. Then, a new service family may be defined and only when all users voluntarily move to the new service family branch are the old primitives removed from the existing set of service primitives. Thus various embodiments allow, e.g., service developers, to detect and address potential drawbacks of any new functions, primitives, etc., before a user has the opportunity to undergo a negative experience.

As described above, an Expert/Decision making manager 120 may be utilized to receive monitored information, and aid the BIONETS service 100 to evolve or cause the creation of a new service. The Expert/Decision making manager 120 may operate in either default or personalized modes, either of which may be selected based on a client application's service request parameters as shown in FIG. 1. In a default mode, a service request may be sent from the client application 105 to the Expert/Decision making manager 120 without parameters and an appropriate service is executed according to a "base-build scenario" defined by its service provider. In a personalized mode, a service request may have user preferences embedded therein that personalize the service execution scenario. The user preferences may be stored in a personal storage space such as on a mobile device hosting the client application 105. Alternatively, some service definition optimizations may be used, e.g., in accordance with a service family principle discussed below.

As also described above, a self-evolving architecture may based at least in part upon the ability of the Expert/Decision making manager 120 to adapt a particular service to an individual user's needs. The Expert/Decision making manager 120 takes into account individual user preferences where corresponding data is provided by the client application 105, for combining available service primitives and data into a fully personalized service oriented to fulfilling that particular user's needs. Such an architecture may effectuate continued evolution of each BIONETS service 100 based on changes in the Expert/Decision making manager 120 and based on updates of the service primitives set. Therefore, in accordance with various embodiments, a simple and robust system and method for updating one or more sets of service primitives and Expert/Decision making manager 120 itself is provided. Moreover, the Expert/Decision making manager 120 provides the ability in various embodiments to create meta-services as a product of the cooperative use of a set of BIONETS services, as well as a method of offering readdressing to another BIONETS service if the that BIONETS service better suits a user request.

When a new user begins utilizing a BIONETS service 100, the user may either utilize the BIONETS service with a default scenario or as a BIONETS service that inherits personalization details of another user. When the BIONETS service 100 is utilized with a default scenario in a default mode, the BIONETS service 100 implements an initial view of the service provider. That is, the service provider's initial view or approach regarding how a user's current dissatisfaction may be addressed. This initial view or approach can be considered to be a base-family of the BIONETS service 100. When the BIONETS service 100 inherits the personalization details of another user, the Expert/Decision making manager 120 associates the new user with some other family of the BIONETS service 100. After an initial assignment to one of these other families, the new user continues to interact with the BIONETS service 100. Therefore, as described above, an identification of a new usage pattern that leads to the creation of a new service instance as a member of a given family group can result. Moreover, this process of development of service families creates a set of implementation (build) branches on top of the original base-family service, which creates targeted self-evolution of the service.

The architecture implemented in accordance with various embodiments also provides the ability to create a meta-service on top of individual BIONETS services. For example, one possible measured parameter in a service use scenario is a sequence of BIONETS services that were executed before and after executing a given service. Based on this information, the client application 105 may suggest the creation of a new meta-service consisting of a number of sequentially executed BIONETS services. This information may be communicated by the client application 105 and processed at the back-end server 110 using the same systems and/or methods as those utilized for defining the combination of service primitives within a BIONETS service 100. The association of services to a meta-service is performed using, e.g., direct links of meta-associations set between various BIONETS services and meta-associations defined separately for each service family. The direct links may determine and/or present those services that should be executed in a particular sequence. Additionally, a prior direct link in the sequence of BIONETS services may enable a corresponding service request to be sent directly to the proper subsequent service in the sequence of BIONETS services.

In light of the above-described creation of meta-services, a first BIONETS service can act as an agent working on behalf of the client application 105. As a result, any service or set of services comprising a user solution may decrease the number of communication transactions between the client application 105 and the back-end server 110, and thus reduce the processing power consumption at the client side. Power usage at a mobile device hosting the client application 105) would be reduced, for example. Furthermore, when BIONETS services operate as agents of the client application 105, the speed of service execution may be increased, thus improving upon a user's overall service experience. It should be noted that upon a new user subscribing to a service as a member of certain family, various embodiments may be configured so that the user will also automatically receive an offer to use any one or more BIONETS meta-services created by other users of the same family in addition to any given service that may have initially been subscribed to by the new user.

Figure 3:
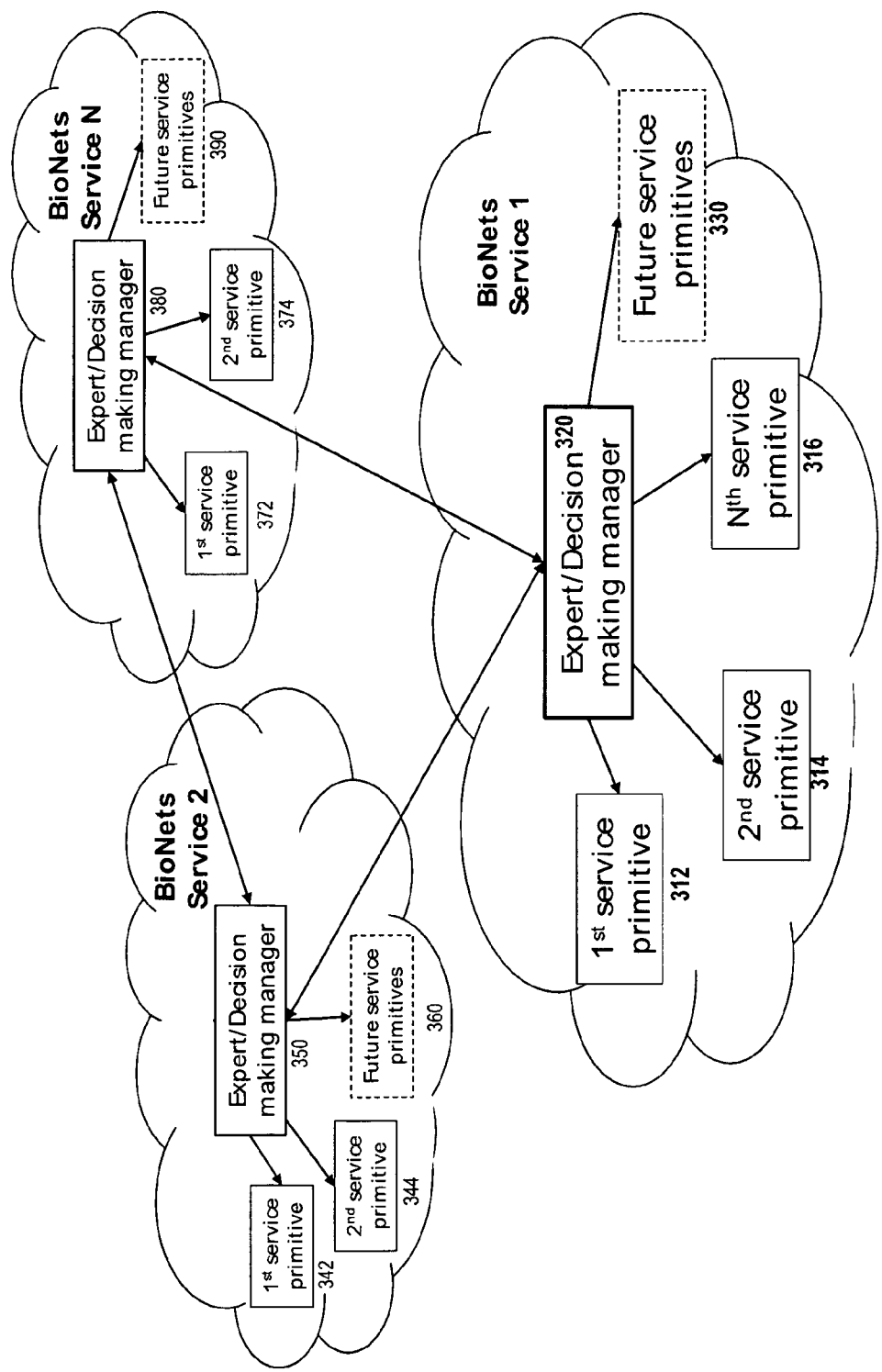
FIG. 3 illustrates an exemplary architecture that allows for the network usage and readdressing of BIONETS services in accordance with various embodiments.

Another aspect of a BIONETS architecture that is implemented in accordance with various embodiments is the ability to allow for internal readdressing to another service. Such internal readdressing may be implemented, for example, by using a readdressing link that may be potentially defined for each service family. FIG. 3 illustrates a BIONETS architecture that supports such internal readdressing, where more than one BIONETS service exists. For example, a first BIONETS service 1 is illustrated, where the BIONETS service 1 comprises, e.g., a first plurality of service primitives 312, 314, and 316, an Expert/Decision making manager 320, and future service primitives 330. A second BIONETS service 2 is also illustrated in FIG. 3, where the BIONETS service 2 comprises, e.g., a second plurality of service primitives 342, 344, a second future service primitives 360, and a second Expert/Decision making manager 350. Furthermore, a third BIONETS service N is illustrated, the BIONETS service N comprises, e.g., an Nth set of service primitives 372 and 374, an Nth future service primitives 390, and an Nth Expert/Decision making manager 380. More or fewer BIONETS services can be implemented in a particular BIONETS architecture configured in accordance with various embodiments. Moreover, more or fewer service primitives may exist in any BIONETS service's network(s).

When a user of a service family or an expert of the service provider that is providing the service family identifies a potential replacement service that the user may utilize, a readdressing link is set to point to that potential replacement service. The potential replacement service may comprise a service of a different type and/or may address a user's dissatisfaction in a substantially different manner. For example, in certain service scenarios, a user's dissatisfaction can be resolved using completely different technical solutions and in some cases even psychological solutions. It should be noted that although various embodiments described herein are directed to addressing a user's dissatisfaction with a particular BIONETS service, such embodiments are not limited to addressing dissatisfaction per se. For example, a user may simply desire a change in his/her service or may wish to test a new and/or different service. Hence, as described above, service families can be maintained, e.g., until no users remain so that potential drawbacks associated with a new module or service can be addressed. Service families may also be maintained in the event that a user determines that a previous service family is better suited to his/her needs.

When a replacement service is associated with a particular service family, a user maintains the ability to continue using the base-family service or switch to the replacement service. For example, a potential replacement service may be automatically offered for a first time and if a user does not accept the replacement service, the user may still request the replacement "manually" at a later time. Likewise, when a replacement service is selected, the base-family service may, e.g., continue to act as a "gate" for the client application 105 in the same manner as described above for meta-services. Referring back to FIG. 3, the BIONETS service 1, in one embodiment, may act as the base-family service, whereas either of the BIONETS services 2 or N, may be potential replacement services.

Figure 4:
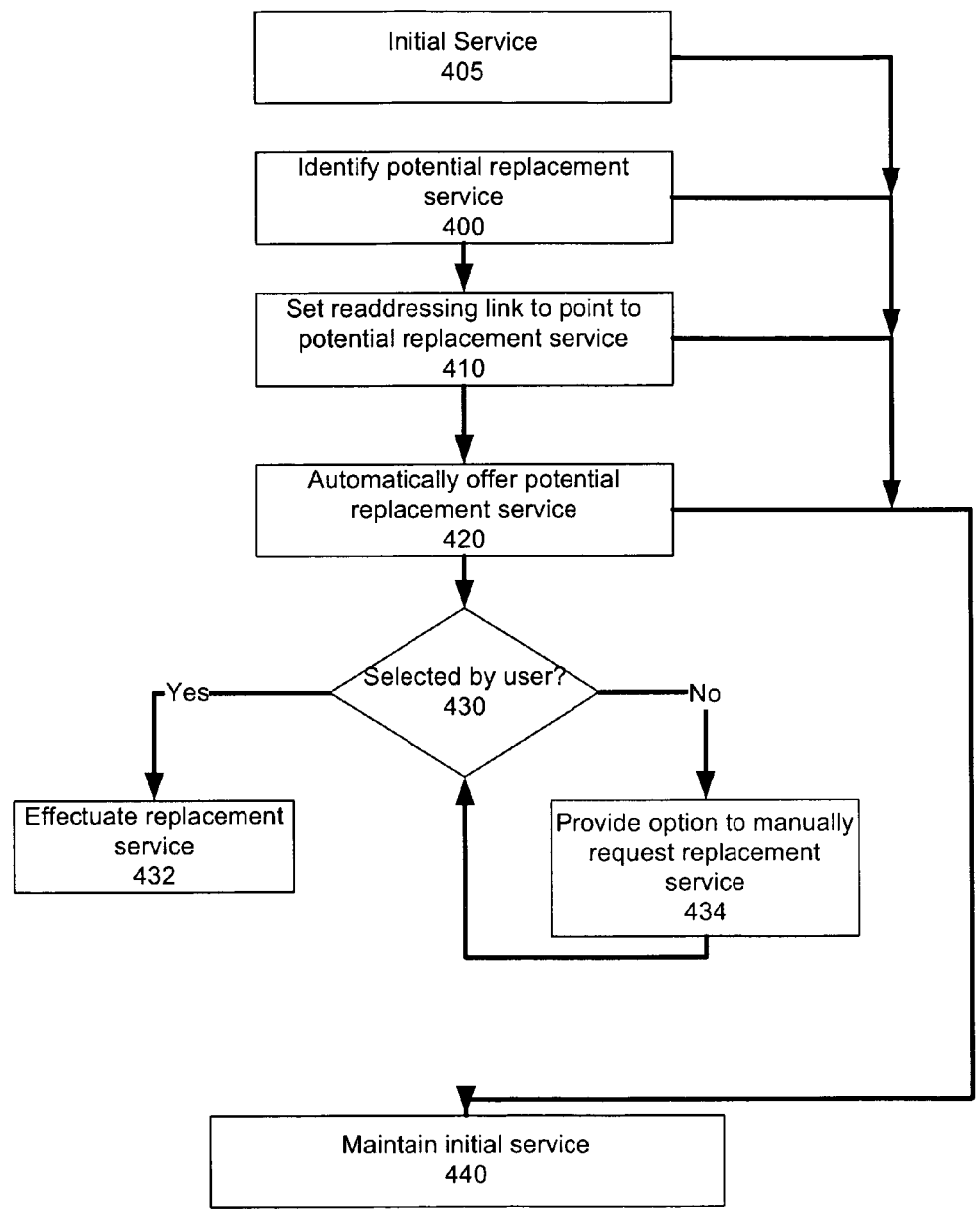
FIG. 4 illustrates a flow chart describing operations performed to effectuate internal readdressing in accordance with various embodiments.

FIG. 4 is a flow chart illustrating processes that may be performed to effectuate internal readdressing in accordance with various embodiments as described above. At 400, a potential replacement service may be identified, either by a user or, by a service provider expert. At 410, a readdressing link which points to the potential replacement service is set. The potential replacement service may be automatically presented to a user at 420. If the user decides to select the potential replacement service, the replacement service is implemented/executed at 432. However, even if the user chooses not to utilize the potential replacement service at the time it is automatically offered, an option to "manually" request the replacement service at a later time is provided at 434. Moreover, regardless of whether a potential replacement service is identified and whether or not the replacement service is chosen to replace an initial service 405 after the automatic presentation of the option or after a manual request, the initial service 405 can be maintained at 440. For example, the initial service can act as a gateway and/or proxy to the replacement service.

Figure 5:
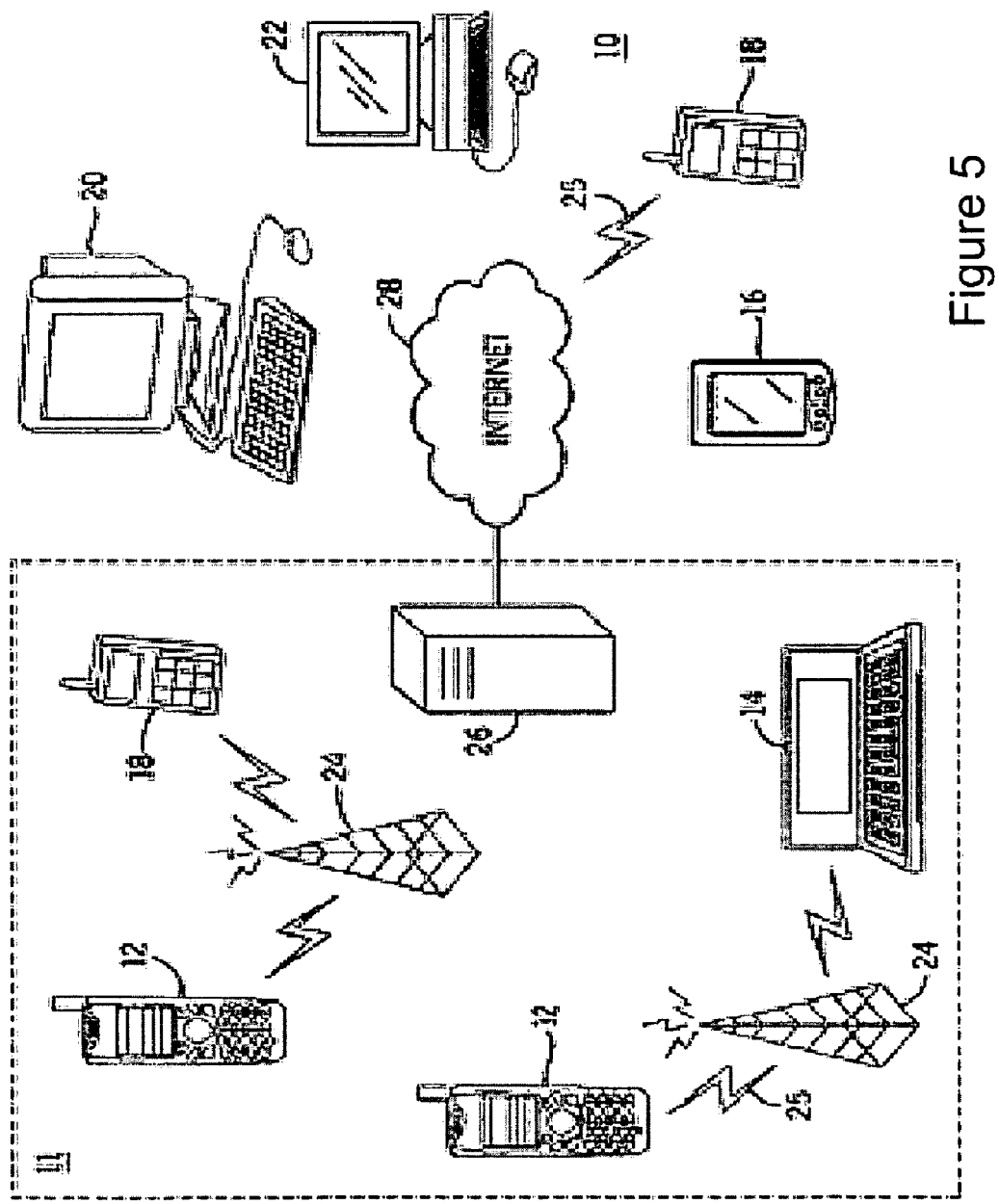
FIG. 5 is an overview diagram of a system within which various embodiments of the present invention may be implemented.

FIG. 5 shows a system 10 in which various embodiments of the present invention can be utilized, comprising multiple communication devices that can communicate through one or more networks. The system 10 may comprise any combination of wired or wireless networks including, but not limited to, a mobile telephone network, a Wireless Local Area Network (WLAN), a Bluetooth personal area network, an Ethernet LAN, a token ring LAN, a wide area network, the Internet, etc. The system 10 may include both wired and wireless communication devices.

For exemplification, the system 10 shown in FIG. 5 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a electronic device 12 in the form of a mobile telephone, a combination personal digital assistant (PDA0 and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, IEEE 802.16, etc. A communication device involved in implementing various embodiments of the present invention may communicate using various media including, but not limited to, radio, infrared, laser, cable connection, and the like.

Figure 6:
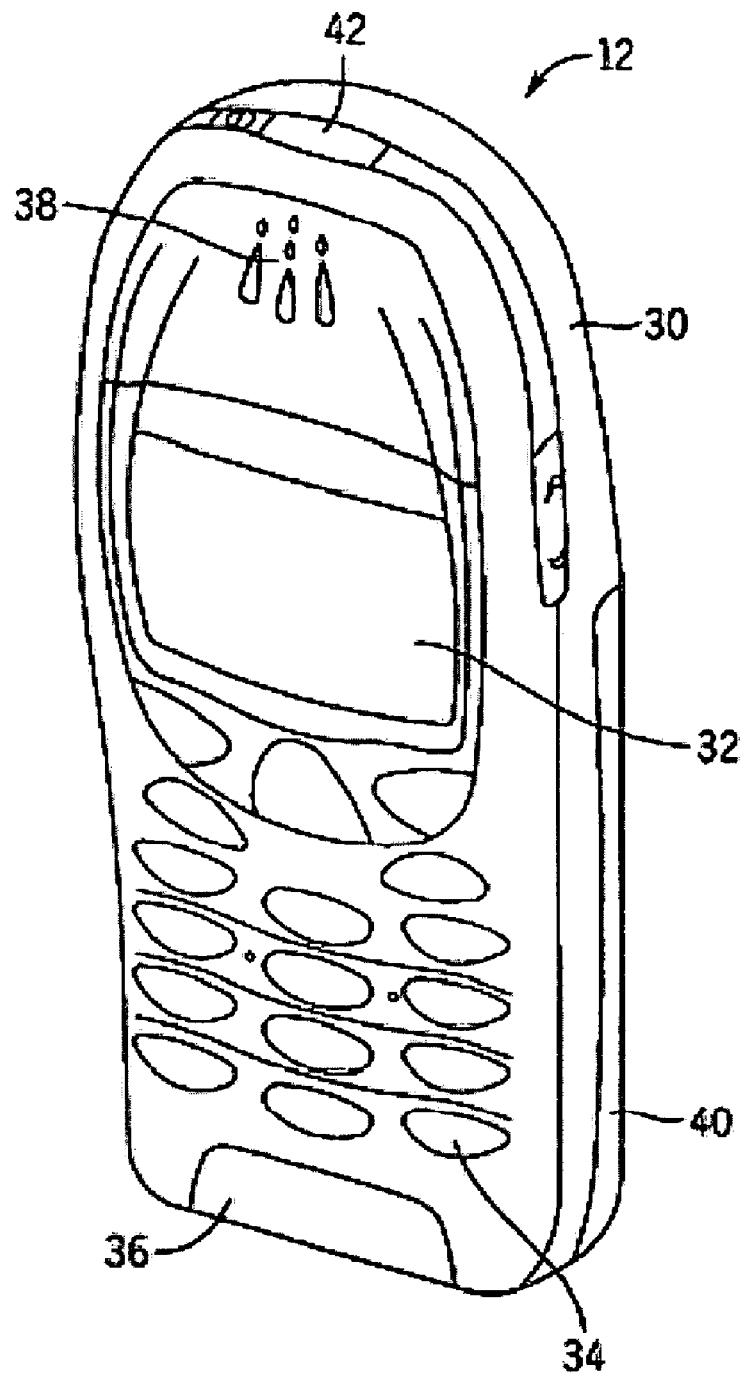
FIG. 6 is a perspective view of an electronic device that can be used in conjunction with the implementation of various embodiments of the present invention.
Figure 7:
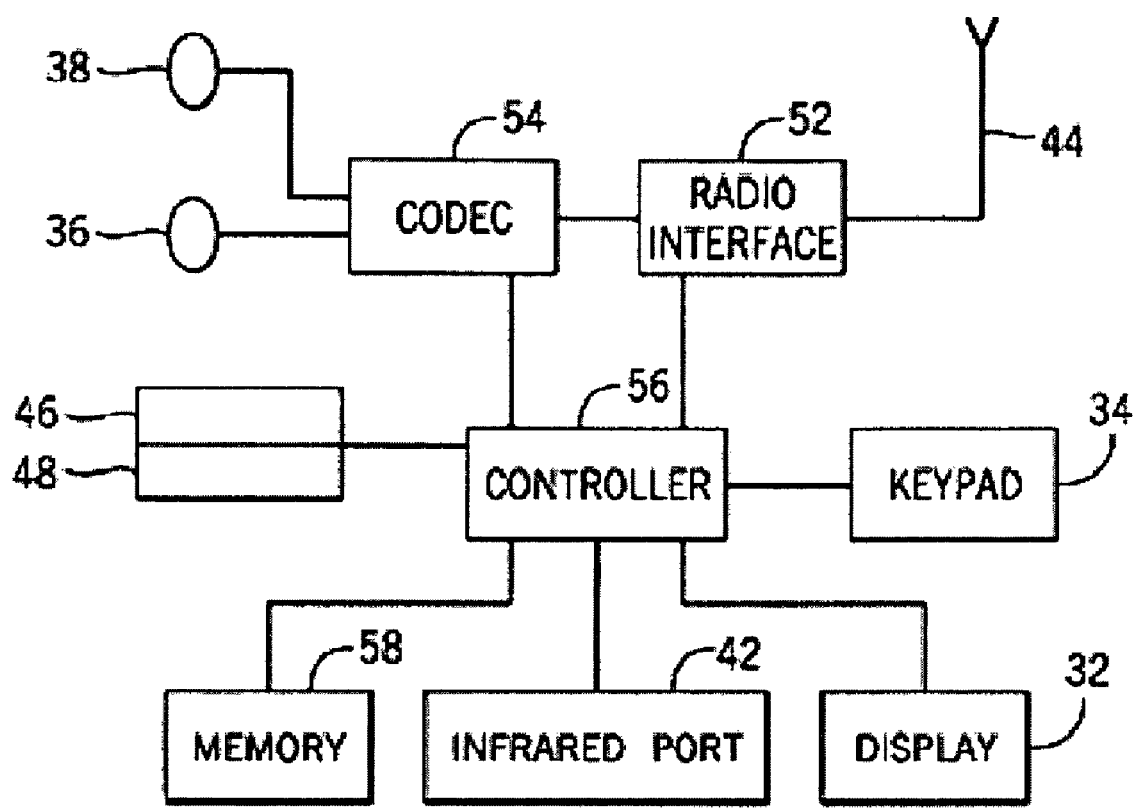
FIG. 7 is a schematic representation of the circuitry which may be included in the electronic device of FIG. 6.

FIGS. 6 and 7 show one representative electronic device 12 within which the present invention may be implemented. It should be understood, however, that the present invention is not intended to be limited to one particular type of device. The electronic device 12 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Various embodiments described herein provide a basis for implementing, e.g., information technology (IT) and telecommunications services capable of self-creation, self-evolution and/or substantive personalization without direct intervention from, e.g., a service provider. The resulting services are flexible and user-friendly, as a basic set of service primitives can be updated and extended at any point. Additionally, the updating and extension need not have an immediate impact to a service, thereby providing a new and/or improved functionality that is adapted to a user's behavior in smooth and "friendly" manner. Additionally, implementation of service families, meta-service and readdressing as described above in accordance with various embodiments allows for the maximization of, e.g., a community training effect, when some interesting service finding of one community user can be easily shared and utilized by other users. Moreover, the systems and methods described herein for implementing/providing a basis for a flexible architecture minimizes resource consumption on the client side.

Various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method comprising:
    monitoring, by a server, activity of a user relating to a first service implemented on a network by a service provider, wherein monitoring the activity includes determining an amount or frequency of parallel use by the user of a third party service with the first service, wherein the third party service is provided by an entity other than the service provider;

collecting and processing measurements associated with the monitored activity, wherein the measurements include the amount or the frequency of parallel use of the third party service with the first service;

determining a pattern of behavior of the user based upon the collected and processed measurements; and utilizing, by the server, the determined pattern of behavior to at least one of self-evolve the first service and self-create a second service for modifying operation of the first service.

2. The method of claim 1 further comprising defining a behavior sequence as a candidate for the pattern of behavior.

3. The method of claim 2, wherein the candidate for the pattern of behavior becomes an active pattern.

4. The method of claim 1 further comprising requesting an alternative implementation of a server hosting the first service.

5. The method of claim 1, wherein the self-evolution of the first service comprises defining a new service family associated with at least one of the self-evolved first service and the self-created second service by adding a new service primitive corresponding to a new functionality to an existing set of service primitives, the existing set of service primitives including old service primitives corresponding to the first service.

6. The method of claim 5, wherein the old service primitives are removed from the existing set of service primitives only when all users utilizing the first service voluntarily switch to utilizing at least one of the self-evolved first service and the self-created second service.

7. The method of claim 1, wherein during utilization of the first service by the user, the first service inherits personalization details of another user.

8. The method of claim 7, wherein the determination of the pattern of behavior recognizes the inheritance by the first service of the personalization details of the other user resulting in the self-evolved first service.

9. The method of claim 1, wherein the collecting and the processing of the measurements comprises determining a sequence of a plurality of services utilized before and after execution of the first service.

10. The method of claim 9, wherein the self-created second service comprises a new meta-service including the first service and the determined sequence of the plurality of services utilized before and after execution of the first service.

11. The method of claim 1 further comprising identifying a potential replacement service for the first service.

12. The method of claim 11 further comprising setting a readdressing link to point to the potential replacement service.

13. The method of claim 1, wherein the first service is a BIONETS service hosted by a back-end server, the back-end server comprising in part, a decision making manager.

14. The method of claim 1, wherein the first service is requested by a client application operating at a mobile device.

15. The method of claim 1, wherein determining a pattern of behavior of the user based upon the collected and processed measurements includes determining that the frequency or the amount of parallel use of the third party service with the first service is above a threshold frequency or amount, respectively, and wherein utilizing the determined pattern of behavior to at least one of self-evolve the first service and self-create a second service for modifying operation of the first service includes modifying the first service to include at least one functionality of the third party service in response to determining that the frequency or the amount of parallel use of the third party service with the first service is above the threshold frequency or amount, respectively.

16. An apparatus, comprising:

a processor; and a memory unit communicatively connected to the processor and including computer code that, when executed, causes the apparatus to:

monitor activity of a user relating to a first service implemented on a network by a service provider, wherein monitoring the activity includes determining an amount or frequency of parallel use by the user of a third party service with the first service, wherein the third party service is provided by an entity other than the service provider;

collect and process measurements corresponding to the monitored activity, wherein the measurements include the amount or the frequency of parallel use of the third party service with the first service;

determine a pattern of behavior of the user based upon the collected and processed measurements; and utilize the determined pattern of behavior to at least one of self-evolve the first service and self-create a second service for modifying operation of the first service.

17. The apparatus of claim 16, wherein the memory unit further comprises computer code that, when executed, causes the apparatus to define a behavior sequence as a candidate for the pattern of behavior.

18. The apparatus of claim 17, wherein the candidate for the pattern of behavior becomes an active pattern.

19. The apparatus of claim 16, wherein the memory unit further comprises computer code that, when executed, causes the apparatus to request an alternative implementation of a server hosting the first service.

20. The apparatus of claim 16, wherein the memory unit further comprises computer code that, when executed, causes the apparatus to define a new service family associated with at least one of the self-evolved first service and the self-created second service by adding a new service primitive corresponding to a new functionality to an existing set of service primitives, the existing set of service primitives including old service primitives corresponding to the first service.

21. The apparatus of claim 20, wherein the memory unit further comprises computer code that, when executed, causes the apparatus to remove the old service primitives from the existing set of service primitives only when all users utilizing the first service voluntarily switch to utilizing at least one of the self-evolved first service and the self-created second service.

22. The apparatus of claim 16, wherein the memory unit further comprises computer code that, when executed, causes the apparatus to inherit, in the first service, personalization details of another user during utilization of the first service by the user.

23. The apparatus of claim 22, wherein the determination of the pattern of behavior recognizes the inheritance by the first service of the personalization details of the other user resulting in the self-evolved first service.

24. The apparatus of claim 16, wherein the memory unit further comprises computer code that, when executed, causes the apparatus to determine a sequence of a plurality of services utilized before and after execution of the first service.

25. The apparatus of claim 24, wherein the self-created second service comprises a new meta-service including the first service and the determined sequence of the plurality of services utilized before and after execution of the first service.

26. The apparatus of claim 16, wherein the memory unit further comprises computer code that, when executed, causes the apparatus to identify a potential replacement service for the first service.

27. The apparatus of claim 26, wherein the memory unit further comprises computer code that, when executed, causes the apparatus to set a readdressing link to point to the potential replacement service.

28. A system, comprising:
   means for monitoring activity of a user relating to a first service implemented on the network, wherein monitoring the activity includes determining an amount or frequency of parallel use by the user of a third party service with the first service, wherein the third party service is provided by an entity other than the service provider;
   means for collecting and processing measurements corresponding to the monitored activity, wherein the measurements include the amount or the frequency of parallel use of the third party service with the first service;
   means for determining a pattern of behavior of the user based upon the collected and processed measurements; and
   means for utilizing the determined pattern of behavior to at least one of self-evolve the first service and self-create a second service for modifying operation of the first service.

29. The system of claim 28 further comprising means for defining a behavior sequence as a candidate for the pattern of behavior.

30. The system of claim 29, wherein the candidate for the pattern of behavior becomes an active pattern.

31. The system of claim 28 further comprising means for requesting an alternative implementation of a server hosting the first service.

32. The system of claim 28, wherein the means for monitoring activity comprises at least one of a client application and client mobile device.

33. One or more non-transitory computer readable media storing computer readable instructions that, when executed, cause an apparatus to:
   monitor activity of a user relating to a first service implemented on a network by a service provider, wherein monitoring the activity includes determining an amount or frequency of parallel use by the user of a third party service with the first service, wherein the third party service is provided by an entity other than the service provider;
   collect and process measurements corresponding to the monitored activity, wherein the measurements include the amount or the frequency of parallel use of the third party service with the first service;
   determine a pattern of behavior of the user based upon the collected and processed measurements; and
   utilize the determined pattern of behavior to at least one of self-evolve the first service and self-create a second service for modifying operation of the first service.

* * * * *